United States Patent
Morihashi et al.

(10) Patent No.: US 12,481,263 B2
(45) Date of Patent: Nov. 25, 2025

(54) CONTROLLER FOR MACHINE TOOL

(71) Applicant: FANUC CORPORATION, Yamanashi (JP)

(72) Inventors: Ryou Morihashi, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 616 days.

(21) Appl. No.: 17/904,458

(22) PCT Filed: Mar. 4, 2021

(86) PCT No.: PCT/JP2021/008489
§ 371 (c)(1),
(2) Date: Aug. 17, 2022

(87) PCT Pub. No.: WO2021/182304
PCT Pub. Date: Sep. 16, 2021

(65) Prior Publication Data
US 2023/0089938 A1    Mar. 23, 2023

(30) Foreign Application Priority Data
Mar. 10, 2020  (JP) ................. 2020-040967

(51) Int. Cl.
*G05B 19/18* (2006.01)
*B23B 1/00* (2006.01)
(Continued)

(52) U.S. Cl.
CPC .............. *G05B 19/182* (2013.01); *B23B 1/00* (2013.01); *B23Q 15/12* (2013.01); *G05B 19/404* (2013.01);
(Continued)

(58) Field of Classification Search
None
See application file for complete search history.

(56) References Cited

U.S. PATENT DOCUMENTS

| | | | |
|---|---|---|---|
| 5,373,220 A | 12/1994 | Tomoguchi | |
| 2017/0285608 A1* | 10/2017 | Sonoda | G05B 19/416 |
| 2019/0033816 A1* | 1/2019 | Yamamoto | G05B 19/182 |

FOREIGN PATENT DOCUMENTS

| | | |
|---|---|---|
| CN | 105122161 A | 12/2015 |
| CN | 107797515 A | 3/2018 |

(Continued)

OTHER PUBLICATIONS

International Search Report issued in PCT/JP2021/008489; mailed May 18, 2021.

*Primary Examiner* — Ryan A Jarrett
(74) *Attorney, Agent, or Firm* — Studebaker Brackett PLLC

(57) ABSTRACT

To provide a controller for a machine tool that can shred shavings in a sure manner, even if a delay in notification occurs at the time of performing oscillation cutting. This controller of machine tools controls the machine tools that perform cutting working of a work by a cutting tool with a spindle and a feed axis operating cooperatively. The controller includes: an oscillation command calculating unit that calculates an oscillation command to cause relative oscillation of the cutting tool and the work, from a rotation speed of the spindle and a positional command of the cutting tool as to the work; a correction amount calculating unit that calculates a correction amount corresponding to an amount of delay notification to the oscillation command calculating unit regarding the rotation speed of the spindle; and a correction amount superimposing unit that superimposes the correction amount on the oscillation command.

2 Claims, 4 Drawing Sheets

(51) Int. Cl.
*B23Q 15/12* (2006.01)
*G05B 19/404* (2006.01)
*G05B 19/4093* (2006.01)

(52) U.S. Cl.
CPC .................... *G05B 19/4093* (2013.01); *G05B 2219/49055* (2013.01)

(56) References Cited

FOREIGN PATENT DOCUMENTS

| JP | 2006-252392 A | 9/2006 |
| JP | 2017-182336 A | 10/2017 |
| JP | 2018-094690 A | 6/2018 |
| JP | 2019-028597 A | 2/2019 |
| JP | 2019-040252 A | 3/2019 |
| JP | 2019-185780 A | 10/2019 |

* cited by examiner

CONTROLLER FOR MACHINE TOOL

TECHNICAL FIELD

The present invention relates to a controller for a machine tool.

BACKGROUND ART

When machining is performed on a workpiece, there has been conventionally used a machine tool such as a lathe which includes at least one spindle for relatively rotating a cutting tool and a workpiece and at least one feeding axis for moving the cutting tool relative to the workpiece, and performs machining on the workpiece using the cutting tool by operating the spindle and the feeding axis in coordination with each other.

In such a machine tool, usually, a cutting tool edge of the cutting tool continuously scrapes off the material of the surface of a workpiece, so that the scraped material includes elongated shavings (chips) depending on the material of the workpiece. The shavings may cling to the cutting tool and hinder the machining on the workpiece. Further, a technique for performing oscillation cutting on a workpiece is known as disclosed in Patent Document 1. In the case of the oscillation cutting, a cutting tool is reciprocated at a predetermined oscillation frequency so that the oscillation phase intersects a workpiece rotating around the spindle. When the oscillation phase intersects the surface of the workpiece, the cutting tool repasses through a portion which the oscillation phase intersects and at which the surface of the workpiece has already been scraped off, so that the cutting tool temporarily separates from the workpiece (idles). Since the oscillation phase periodically intersects the surface of the workpiece, the cutting tool periodically separates from the surface of the workpiece (idles). Therefore, the shavings are shredded into pieces of a certain length, and the problem that the shavings cling to the cutting tool is solved.

Patent Document 1: Japanese Unexamined Patent Application, Publication No. 2018-94690

DISCLOSURE OF THE INVENTION

Problems to be Solved by the Invention

When oscillation cutting is performed on a workpiece, for example, in a servo controller for controlling a feeding axis, an oscillation command for causing the cutting tool to reciprocate at a predetermined oscillation frequency is superimposed on a position command for moving the cutting tool along the feeding axis. This oscillation command is calculated based on a feed-per-revolution amount of the cutting tool (the position of the cutting tool every revolution of the spindle) during machining and the rotation speed of the spindle.

However, a spindle control unit rotates the spindle by a command from CNC, and the feedback thereof is notified to the servo controller. Therefore, a notification delay is involved in the rotation speed of the spindle to be used to calculate the oscillation command.

When the cutting tool is oscillated relative to the workpiece, such a notification delay causes the oscillation phase to shift with respect to the phase of the spindle (workpiece), so that the oscillation phase may not intersect the workpiece, and thus the shavings may not be efficiently shredded. This problem does not occur in a case where machining is performed by controlling the rotation speed of the spindle to be constant, but it occurs in a case where machining is performed while the rotation speed of the spindle is changed, for example, in a case where machining is performed on a workpiece having a tapered outer shape while the peripheral speed of the workpiece is controlled to be constant. This is because the magnitude of the shift amount of the oscillation phase corresponding to the notification delay changes according to the rotation speed of the spindle. Therefore, it is desired that a machine tool for performing oscillation cutting be capable of reliably shredding shavings even if a notification delay occurs.

Means for Solving the Problems

One aspect of the present disclosure is directed to a controller for controlling a machine tool that performs machining on a workpiece with a cutting tool by operating a spindle and a feeding axis in coordination with each other, the controller including: an oscillation command calculation unit that calculates an oscillation command for relatively oscillating the cutting tool and the workpiece, from a rotation speed of the spindle and a position command of a relative position of the cutting tool with respect to the workpiece; a compensation amount calculation unit that calculates a compensation amount corresponding to a notification delay of the rotation speed of the spindle to the oscillation command calculation unit; and a compensation amount superimposition unit that superimposes the compensation amount on the oscillation command.

Effects of the Invention

According to one aspect, it is possible to provide a controller for a machine tool that can reliably shred shavings even if a notification delay occurs when oscillation cutting is performed.

PREFERRED MODE FOR CARRYING OUT THE INVENTION

Figure 1:
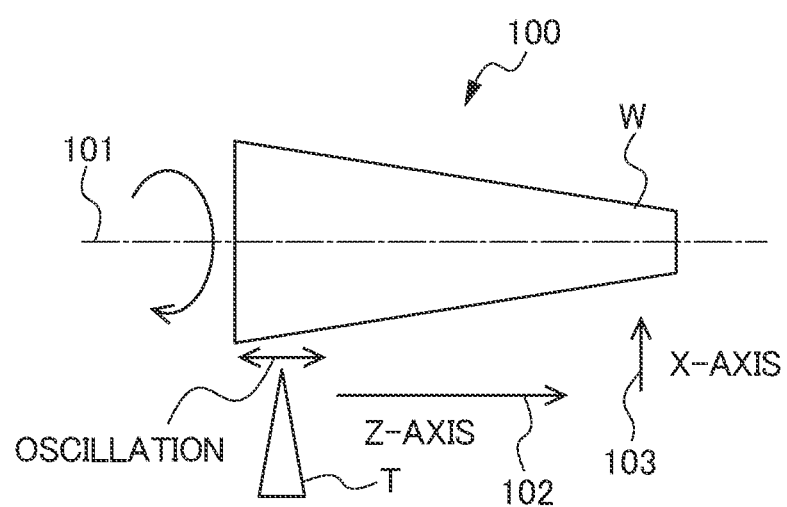
FIG. 1 is a diagram showing a state where oscillation cutting is performed on a workpiece by a machine tool according to an aspect of the present disclosure.
Figure 2:
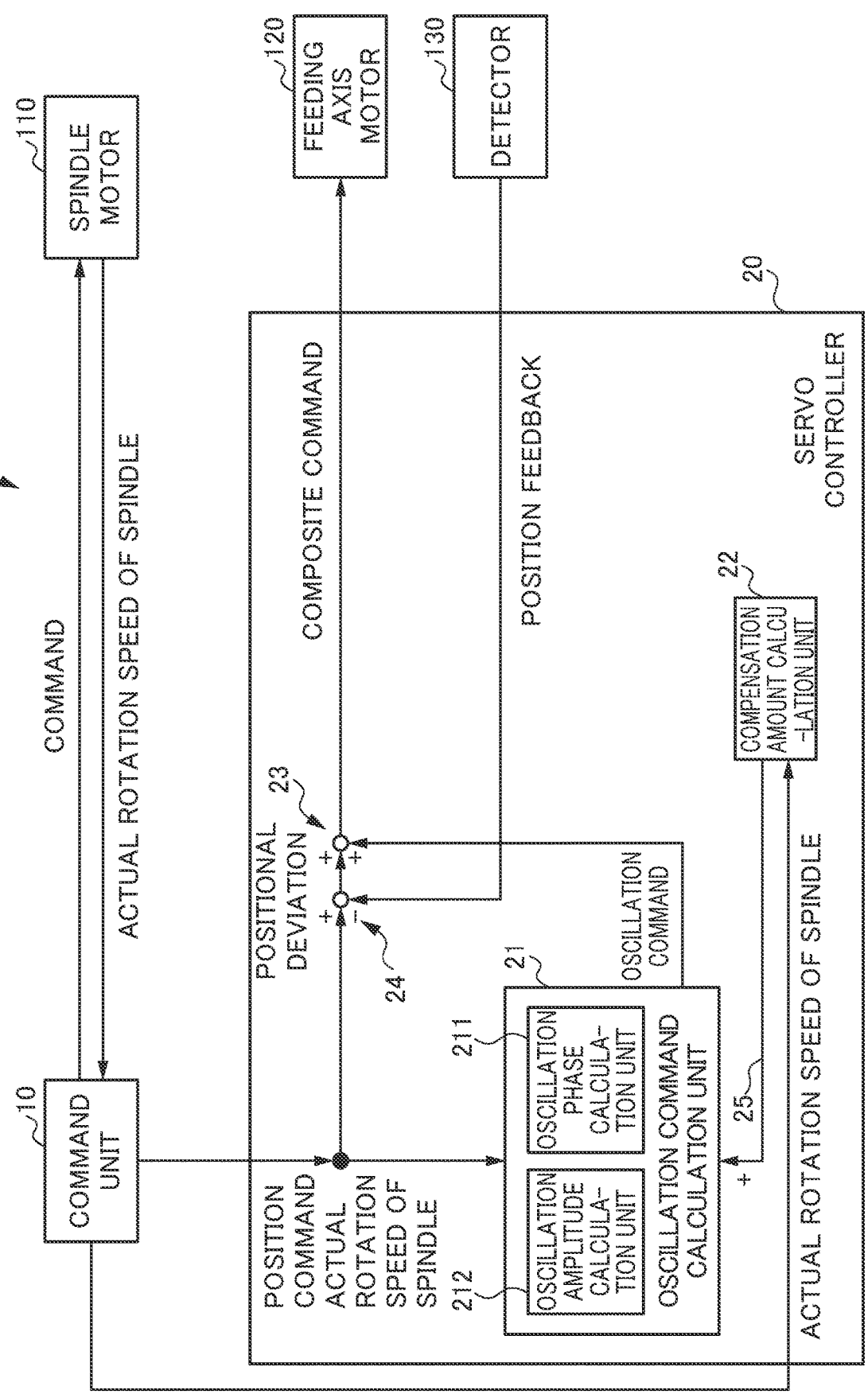
FIG. 2 is a block diagram showing a configuration of a controller for the machine tool according to the aspect of the present disclosure.

One aspect of the present disclosure will be described with reference to the drawings. FIG. 1 is a diagram showing a state where oscillation cutting is performed on a workpiece by a machine tool according to the one aspect of the present disclosure. FIG. 2 a block diagram showing a configuration of a controller for the machine tool according to the one aspect of the present disclosure.

As shown in FIG. 1, a machine tool 100 is an NC lathe for performing machining on a workpiece U as a machining target by using a cutting tool T. The machine tool 100 has at least three control axes including a spindle 101 for rotating the workpiece W relative to the cutting tool T, a feeding axis 102 for moving the cutting tool T relative to the workpiece W in a Z-axis direction parallel to a rotary axis of the spindle 101, and an incision axis 103 for moving the cutting tool T relative to the workpiece W in an X-axis direction which is a radial direction of the spindle 101. In the machine tool 100, these three control axes 101, 102, and 103 operate in coordination with one another, thereby performing machining on the workpiece W.

In one aspect of the present disclosure, the spindle 101 is adapted to rotate the workpiece W around the rotary axis of the spindle 101 relative to the cutting tool T, and the feeding axis 102 is adapted to move the cutting tool T along the axial direction of the feeding axis 102 relative to the workpiece W. The feeding axis 102 is capable of performing an operation for feeding and moving the cutting tool T in the Z-axis direction in the rotary axis direction of the spindle 101, and an operation of reciprocating, that is, oscillating the cutting tool T in the Z-axis direction. The incision axis 103 is adapted to move the cutting tool T relative to the workpiece W in the X-axis direction which is the radial direction of the spindle 101.

The workpiece W shown in FIG. 1 is a workpiece whose outer diameter varies in the Z-axis direction. In other words, the workpiece W has a tapered outer shape whose outer diameter gradually decreases in the left-to-right direction in FIG. 1 When oscillation cutting is performed on the workpiece W having such a shape, the cutting tool T is fed while reciprocating in either the Z-axis direction or the X-axis direction relative to the outer peripheral surface of the workpiece W. At this time, the feeding axis 102 and the incision axis 103 operate in coordination with each other. In the following description, a case where oscillation cutting is performed by feeding the cutting tool T while the cutting tool T reciprocates in the Z-axis direction relative to the outer peripheral surface of the workpiece W will be described.

The machine tool 100 has drive motors for driving these control axes 101, 102, 103. FIG. 2 shows only a spindle motor 110 which is a drive motor for driving the spindle 101, and a feeding axis motor 120 which is a drive motor for driving the feeding axis 102 out of these drive motors. Further, as shown in FIG. 2, the machine tool 100 includes a command unit 10 that outputs a command for rotationally driving the spindle 101 to the spindle motor 110, and a servo controller 20 for driving and controlling the feeding axis motor 120.

The command unit 10 is constituted by, for example, a computer numerical control (CNC) or a controller of the spindle 101. The command unit 10 is connected to the spindle motor 110 and the servo controller 20 so as to be capable of communicating with them, and outputs a command including a rotation speed of the spindle 101 to the spindle motor 110. Further, the command unit 10 outputs the actual rotation speed of the spindle 101 acquired from the spindle motor 110 to the servo controller 20.

In consideration of the life time of the tool and the like, the command unit 10 may control the rotation speed of the spindle 101 so that the peripheral speed of the workpiece W is constant relative to the cutting tool T during machining. In other words, when machining is performed on the workpiece W having the tapered shape shown in FIG. 1, the command unit 10 outputs a command for changing the rotation speed of the spindle 101 to the spindle motor 110 so that the peripheral speed of the workpiece W is constant relative to the cutting tool T during machining. Therefore, the command unit 10 has a function of calculating a position command for the feeding axis 102 and the incision axis 103 (feed-per-revolution amounts of the feeding axis 102 and the incision axis 103) based on a speed command for the spindle 101 (spindle motor 110) and the feeding speeds of the cutting tool T along the feeding axis 102 and the incision axis 103. This position command will serve as a command indicating a target position when the cutting tool T is fed in a direction along a Generating line of the outer peripheral surface of the workpiece W (machining direction).

The servo controller 20 controls the drive of the feeding axis motor 120 to control the feeding movement of the cutting tool T in the axial direction of the feeding axis 102 relative to the workpiece W. The servo controller 20 includes an oscillation command calculation unit 21, a compensation amount calculation unit 22, an adder 23, and a subtractor 24. The servo controller 20 can be constituted by a computer including memories such as ROM (Read Only Memory) and RAM (Random Access Memory), CPU (Control Processing Unit), and a communication control unit which are connected to one another via a bus. Therefore, the CPU and the memory installed in the computer and a control program stored in the memory cooperate with one another to achieve the function or operation of each component of the servo controller 20.

The oscillation command calculation unit 21 calculates an oscillation command for relatively oscillating the cutting tool T and the workpiece W in the axial direction of the feeding axis 102 so that the cutting tool T performs cutting while contacting or separating from the workpiece W (idling), based on the position command and the actual rotation speed of the spindle 101 sent from the command unit 10 to the servo controller 20.

The oscillation command is a periodic command calculated by multiplying the actual rotation speed of the spindle 101 by a multiplying factor, and it is expressed, for example, as the following expression (1).

[Expression 1]

$$\text{OSCILLATION COMMAND} = \frac{K \times F}{2}\cos\left(2\pi \times \frac{S}{60} \times I \times t\right) - \frac{K \times F}{2} \quad (1)$$

In the above expression (1), K represents an oscillation amplitude multiplying factor, F represents a stroke of the cutting tool T per revolution of the workpiece W, that is, a feed-per-revolution amount [mm/rev], S represents the rotation speed [min$^{-1}$] around the rotary axis of the spindle 101 (the workpiece W), I represents an oscillation frequency multiplying factor, and t represents a time [s] from the start of the oscillation. Further, (K×F)/2 represents an oscillation amplitude [mm], and 2π×S/60×I×t represents an oscillation phase [rad]. The oscillation amplitude multiplying factor K and the oscillation frequency multiplying factor I are constants. The oscillation amplitude multiplying factor K is a number equal to or greater than 1, and the oscillation frequency multiplying factor I is a non-integer greater than zero (e.g., a positive non-integer such as 0.5, 0.8, 1.2, 1.5, 1.9, 2.3, or 2.5). The values of the oscillation amplitude multiplying factor K and the oscillation frequency multiplying factor I are stored in a storage unit (not shown) before the machine tool 100 is operated.

As indicated by the above expression (1), the oscillation command includes the oscillation phase and the oscillation amplitude. Therefore, the oscillation command calculation unit 21 includes an oscillation phase calculation unit 211 for calculating the oscillation phase, and an oscillation amplitude calculation unit 212 for calculating the oscillation amplitude. The oscillation command calculation unit 21 calculates the oscillation phase and the oscillation amplitude based on the position command and the actual rotation speed of the spindle 101 sent from the command unit 10 to calculate an oscillation command as exemplified by the above expression (1).

The oscillation command calculated by the oscillation command calculation unit 21 is superimposed on (added to) the position command sent from the command unit 10 in the adder 23. As a result, a composite command is calculated in the adder 23. The composite command calculated by the adder 23 is a command for oscillating the cutting tool T in the axial direction of the feeding axis 102 relative to the workpiece W, and is sent from the servo controller 20 to the feeding axis motor 120. The feeding axis motor 120 is driven and controlled based on this composite command, and causes the cutting tool T to relatively reciprocate in the axial direction of the feeding axis 102 during oscillation cutting. In this way, the cutting tool T is caused to perform an oscillation operation on the workpiece W.

As shown in FIG. 2, the machine tool 100 includes a detector 130 such as a pulse coder for detecting the position of the feeding axis 102 driven by the feeding axis motor 120 (the position of the cutting tool T). Using the subtractor 24, the servo controller 20 determines a positional deviation which is a difference between the position command sent from the command unit 10 and the position feedback (actual position) of the feeding axis 102 (cutting tool T) sent from the detector 130. The subtractor 24 is provided to determine a positional deviation between the position command before the superimposition of the oscillation command in the adder 23 and the position feedback sent from the detector 130. Therefore, in the adder 23, the oscillation command calculated by the oscillation command calculation unit 21 is superimposed on the position command after the positional deviation is determined.

The compensation amount calculation unit 22 calculates, as a compensation amount, an oscillation phase corresponding to a notification delay based on the actual rotation speed of the spindle 101 sent from the command unit 10 to the servo controller 20, and superimposes the compensation amount on the oscillation phase in the oscillation command. As a result, an oscillation command as expressed, for example, by the following expression (2) is calculated.

[Expression 2]

$$\text{OSCILLATION COMMAND} = \frac{K \times F}{2} \cos\left(2\pi \times \frac{S}{60} \times I \times t + \text{COMPENSATION AMOUNT}\right) - \frac{K \times F}{2} \quad (2)$$

The oscillation phase is calculated according to $(2\pi \times S \times I/60)t$ in the above expression (2) when it is expressed in terms of the time t from the start of oscillation. However, when the oscillation phase is expressed in terms of oscillation phase addition of each calculation cycle $\Delta t$ from the start of oscillation, it may be calculated according to oscillation phase (before $\Delta t$ seconds)+$(2\pi \times S \times I/60)\Delta t$.

The compensation amount calculation unit 22 can calculate the compensation amount from at least one selected from the actual rotation speed, the notification delay, time, and a parameter value of the spindle 101. The parameter value does not have to be the compensation value itself, but may be a notification delay, a notification cycle, or the like. Further, the compensation amount may be a fixed value. For example, when the compensation amount is calculated from the notification delay, the compensation amount can be expressed as the following expression (3).

[Expression 3]

$$\text{COMPENSATION AMOUNT} = \text{NOTIFICATION DELAY} \times 2\pi \times \frac{S}{60} \times I \quad (3)$$

The unit of the notification delay is the dimension of time (e.g., 12 msec). This not delay changes depending on the actual rotation speed of the spindle 101, notification means, or a notification method.

The compensation amount calculated by the compensation amount calculation unit 22 is superimposed, via a connection line 25, on the oscillation phase in the oscillation command calculated by the oscillation command calculation unit 21. The connection line 25 constitutes a compensation amount superimposition unit.

A specific method of superimposing the compensation amount on the oscillation phase in the oscillation command includes a case where a compensation amount at the time when compensation is performed is superimposed, and a case where a difference from the compensation amount in previous compensation is superimposed. In the case where a compensation amount at the time when compensation is performed is superimposed, for example, the oscillation phase after the compensation is expressed, for example, as the following expression (4). Here, tc represents a communication delay.

[Expression 4]

$$\text{OSCILLATION PHASE AFTER COMPENSATION} = \text{OSCILLATION PHASE} + \frac{2\pi SI}{60}tc \quad (4)$$

In the case where the difference from the compensation amount in the previous compensation is superimposed, the oscillation phase after the compensation can be expressed, for example, as the following expression (5).

OSCILLATION PHASE AFTER COMPENSATION = $\quad$ (5)

$$\left(\frac{2\pi S_2 I}{60}\Delta t + \frac{2\pi S_2 I}{60}tc\right) + \left(\frac{2\pi S_2 I}{60}\Delta t + \frac{2\pi (S_2 - S_1)I}{60}tc\right) +$$

$$\cdots \left(\frac{2\pi S_n 1}{60}\Delta t + \frac{2\pi (S_n - S_{n-1})I}{60}tc\right) =$$

COMPENSATED OSCILLATION PHASE (BEFORE $\Delta t$ SECOND) +

$$\frac{2\pi S_n I}{60}\Delta t + \frac{2\pi (S_n - S_{n-1})I}{60}tc$$

When the compensation amount calculated by the compensation amount calculation unit 22 is superimposed on the oscillation command, an oscillation command resulting from superimposition of a compensation amount expressed by, for example, the expression 2 on the position command sent from the command unit 10 in the adder 23 is created as a composite command. Therefore, in this case, the servo controller 20 controls the feeding axis 102 by outputting, to the feeding axis motor 120, the composite command resulting from superimposition of the oscillation command on which the compensation amount has been superimposed on the position command, thereby controlling the oscillation operation of the cutting tool T relative to the workpiece W.

Figure 3:
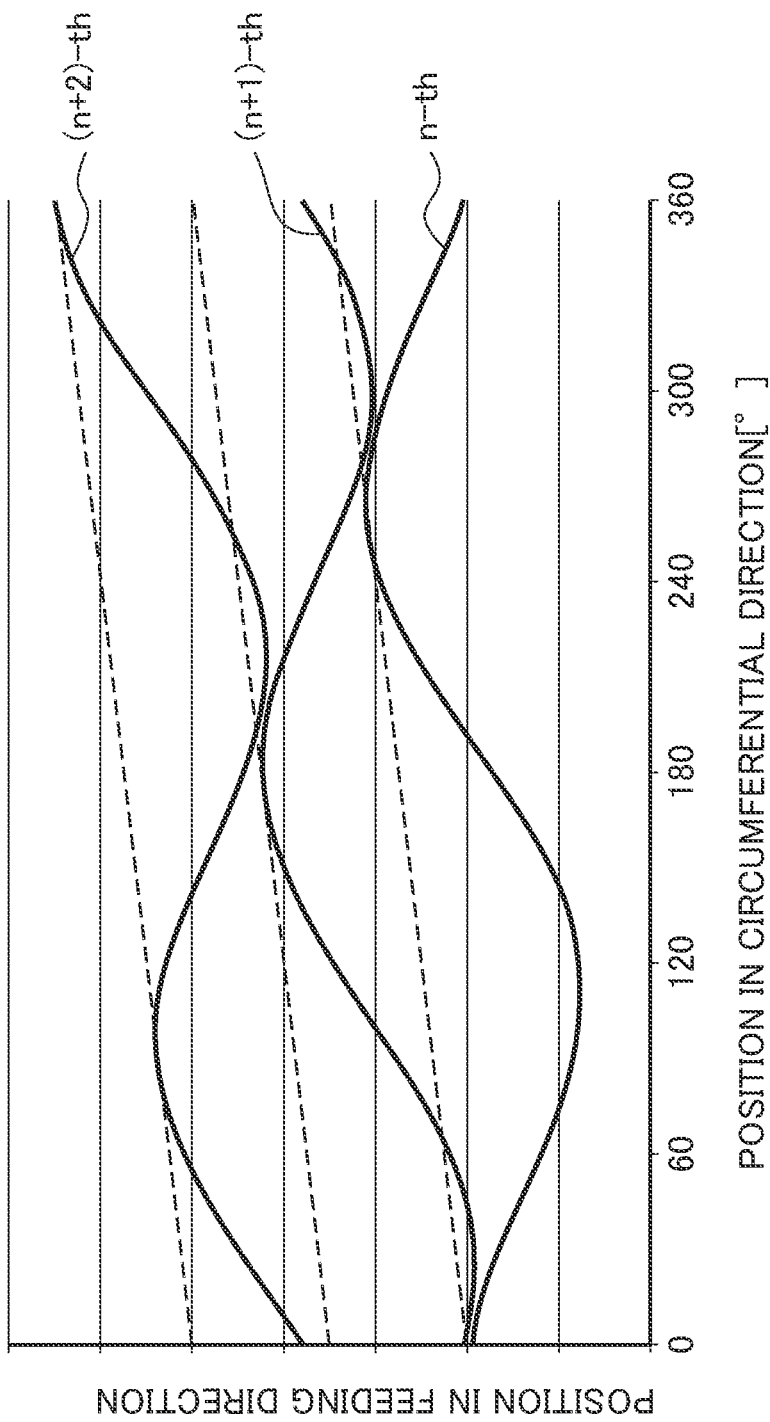
FIG. 3 is a graph showing a path of the cutting tool on the surface of the workpiece under oscillation cutting in a state where a notification delay is not compensated.

Here, FIG. 3 shows a path of the cutting tool T on the surface of the workpiece under oscillation cutting in a state where a notification delay is not compensated. The vertical axis represents a position in the feeding direction that indicates the position of the cutting tool T along the feeding axis 102, and the horizontal axis represents a position in the circumferential direction that indicates the position of the workpiece W in accordance with the rotation of the spindle 101. In the case of the workpiece W having a tapered shape, since the rotation speed of the spindle 101 is controlled by the servo controller 20 so that the peripheral speed of the workpiece W with respect to the cutting tool T is constant, in a state where the notification delay is not compensated, even when the cutting tool T is oscillated relative to the workpiece W, the respective oscillation phases of n-th, (n+1)-th, (n+2)-th, . . . are shifted from one another in the circumferential direction of the workpiece W, so that they may not intersect one another. This is because the shift of the oscillation phase caused by the notification delay is sequentially accumulated. Therefore, the cutting tool T continues to cut the surface of the workpiece W without periodically separating from the workpiece W (idling). Therefore, shavings are hardly or not at all shredded.

Figure 4:
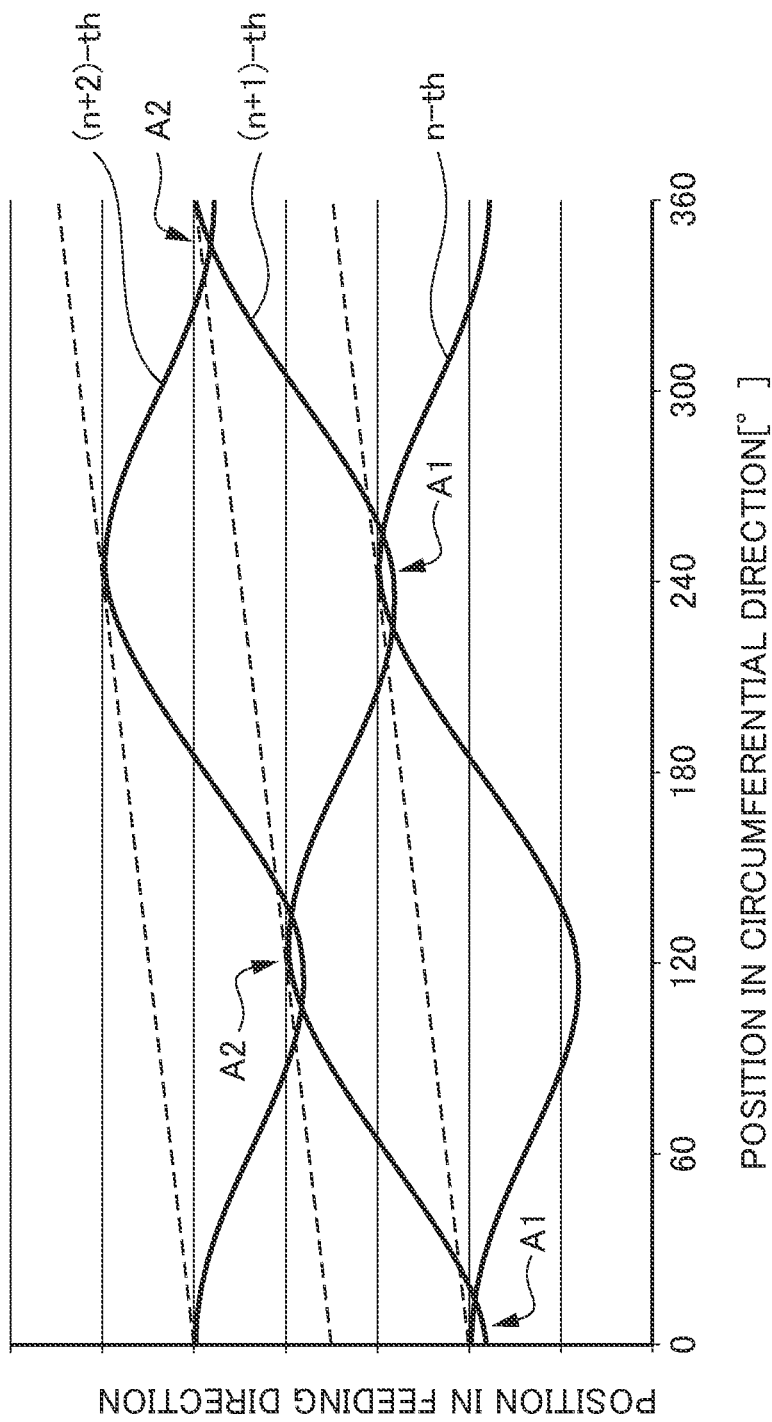
FIG. 4 is a graph showing a path of the cutting tool on the surface of the workpiece under oscillation cutting in a state where a notification delay has been compensated.

On the other hand, FIG. 4 shows a path of the cutting tool T on the surface of the workpiece under oscillation cutting in a state where a notification delay has been compensated. As shown in FIG. 4, in a state where the notification delay has been compensated, the respective oscillation phases of n-th, (n+1)-th, (n+2)-th, . . . can intersect one another by way of oscillation the cutting tool T relative to the workpiece W. In other words, the oscillation phase of n-th and the oscillation phase of (n+1)-th intersect each other at places A1 and A1 approximately every 240°, and the oscillation phase of (n+1)-th and the oscillation phase of (n+2)-th also intersect each other at places A2 and A2 approximately every 240°. Therefore, the cutting tool T periodically separates from the workpiece W (idles), and the shavings are shredded each time.

That is, one aspect of the present disclosure provides the controller (servo controller 20) for the machine tool 100, the controller including: the oscillation command calculation unit 21 that calculates an oscillation command for oscillating the cutting tool T relative to the workpiece W, from the rotation speed of the spindle 101 and a position command of the relative position of the cutting tool T with respect to the workpiece W; the compensation amount calculation unit 22 that calculates a compensation amount corresponding to a notification delay of the rotation speed of the spindle 101 to the oscillation command calculation unit 21; and the compensation amount superimposition unit (connection line 25) that superimposes the compensation amount on the oscillation command. Due to this feature, even in a case where a notification delay has occurred when the cutting tool T is performing oscillation cutting on the workpiece W, the cutting tool T can be oscillated relative to the workpiece W based on the oscillation command for which the notification delay has been compensated. Therefore, the oscillation phases can intersect one another periodically, whereby the shavings can be reliably shredded.

The oscillation command calculation unit 21 calculates the oscillation command from the oscillation phase calculated based on the rotation speed of the spindle 101 and the oscillation amplitude calculated based on the position command. The compensation amount calculation unit 22 calculates, as a compensation amount, a change in oscillation phase corresponding to a notification delay time of the rotation speed of the spindle 101, and superimposes the compensation amount on the oscillation phase in the oscillation command. Due to this feature, the shift of the oscillation phase can be eliminated by means of the compensation amount, and shavings can be further reliably shredded by the oscillation cutting.

Further, since the compensation amount calculation unit 22 calculates the compensation amount from at least one selected from the rotation speed of the spindle 101, the notification delay time, and the parameter value, it is possible to easily calculate a compensation amount which enables shredding of shavings.

One aspect of the present disclosure is configured such that the cutting tool T moves in the axial direction of the feeding axis 102 relative to the workpiece W. However, the one aspect of the present disclosure may be configured such that the workpiece W moves in the Z-axis direction along the axial direction of the feeding axis 102 relative to the cutting tool T. Further, the spindle 101 may be adapted to rotate and move the cutting tool T in the circumferential direction of the workpiece W relative to the workpiece W. Further, when end face machining is performed on the workpiece W, the feeding axis 102 may be adapted to move the cutting tool in the radial direction of the spindle 101 relative to the workpiece W.

The outer shape of the workpiece H described above is an example, and is not limited to the tapered shape. The workpiece W may have various other outer shapes such as an arc shape or a circular column shape. The controller of the machine tool of the present disclosure may be preferably applied to a case of performing machining with a change in rotation speed of the spindle 101 (workpiece W), which causes a problem of a notification delay when the cutting tool T performed oscillation cutting on the workpiece W.

EXPLANATION OF REFERENCE NUMERALS

20: Servo controller
21: Oscillation command calculation unit
22: Compensation amount calculation unit
25: Connection line (Compensation amount superimposition unit)
100: Machine tool
101: Spindle
102: Feeding axis
T: Cutting tool
W: Workpiece

The invention claimed is:

1. A controller for controlling a machine tool that performs machining on a workpiece with a cutting tool by operating a spindle and a feeding axis in coordination with each other, the controller comprising:
a processor configured to:
calculate an oscillation command for relatively oscillating the cutting tool and the workpiece, from a rotation speed of the spindle and a position command of a relative position of the cutting tool with respect to the workpiece;
calculate a compensation amount corresponding to a notification delay of the rotation speed of the spindle to the processor when calculating the oscillation command; and
superimpose the compensation amount on the oscillation command,
wherein the processor is configured to calculate the oscillation command from an oscillation phase calculated based on the rotation speed of the spindle and an oscillation amplitude calculated based on the position command, and wherein the processor is configured to calculate, as the compensation amount, a change in oscillation phase corresponding to a notification delay time of the rotation speed of the spindle, and superimpose the compensation amount on the oscillation phase in the oscillation command.

2. The controller for a machine tool according to claim 1, wherein the processor is configured to calculate the compensation amount from at least one selected from the rotation speed of the spindle, a notification delay time, and a parameter value.

\* \* \* \* \*